2,964,388
METHOD FOR THE PRODUCTION OF ZIRCONIUM BORIDE

Helmut Espenschied, Metuchen, N.J., assignor to National Lead Company, New York, N.Y., a corporation of New Jersey No Drawing. Filed July 10, 1953, Ser. No. 367,365

2 Claims. (Cl. 23—204)

The present invention relates in general to refractory metal compounds and more particularly to an improved method for producing zirconium compounds of boron.

Heretofore, refractory metal compounds of carbon, boron and the like, sometimes referred to hereinafter as metalloids, have been prepared with a modicum of success by heating dry mixtures of a refractory metal oxide, such as for example calcined zirconium oxide, carbon and an oxidic compound of boron to form the refractory metal boride. However, prior methods have had to contend with the problem of obtaining intimate and permanent contact between the inherently coarse metal oxide particles and the carbon particles which, due to their fineness, tend to separate out from the mixture during the reaction. In attempting to overcome this difficulty, prior technicians have resorted to pelletizing the mixtures and then heating the pellets at relatively high temperatures. The resulting product has been a hard sintered material which must be subsequently broken up into smaller particles. However, inasmuch as these products can be ground mechanically to form a finely divided powder only with great difficulty, these methods have not offered a direct and commercially practical process for producing finely divided, pure refractory metal compounds.

An object, therefore, of the present invention is to provide an improved method for making a zirconium compound of carbon and boron which is economical, which may be carried out at relatively low temperatures and which is productive directly of a relatively pure finely divided product.

A further object of the invention is to provide a superior method for forming a mixture of zirconium and carbon wherein the carbon particles are maintained in intimate contact with the zirconium.

These and other objects will become apparent from the following more complete description of the invention.

The term "finely divided" as used herein with reference to the size of the zirconium boride particles formed directly by the process of this invention shall be understood to mean that the effective sizes of the particles may vary from 1 to 20 microns.

In its broadest aspects the present invention relates to a new and improved compound of zirconium boride; and to an improved method for making said compound which comprises forming an intimate mixture of a zirconia hydrate, carbon and boric acid and heating the mixture in an inert atmosphere at a temperature sufficiently high to complete the reaction between the materials and produce finely divided zirconium boride.

In carrying out the invention it was discovered that the successful production of substantially pure finely divided zirconium boride is dependent, in large measure, upon achieving both an intimate mixture of the carbon and zirconium components and well as a high degree of reactivity therebetween. As pointed out above, due to the coarseness of a calcined oxide of zirconium, as compared to the particle size of lamp black, it is impossible to form and maintain an intimate mixture of a calcined zirconium dioxide and the finely divided carbon during reaction. Moreover, extremely high temperatures must be used. However, the instant invention embraces the discovery that the problem of maintaining intimate mixtures of zirconium oxide and carbon and reacting the mixture at relatively low temperatures can be effectively solved by providing the zirconium component in the form of a hydrated zirconium oxide pulp, sometimes hereinafter referred to as zirconia hydrate.

The zirconia hydrate used in carrying out the process of this invention may be formed by first preparing a purified solution of zirconium sulfate, as for example by repeated recrystallization of zirconium sulfate from a sulfuric acid solution containing hydrochloric acid, thereby to prevent the impurities in the solution from contaminating the zirconium sulfate crystals; and then adding ammonium hydroxide to the purified solution of zirconium sulfate to precipitate out zirconium hydroxide. The zirconium hydroxide precipitate is then filtered off and washed free of ammonium sulfate. The hydrated zirconium oxide pulp so produced contains from 16 to 18% $ZrO_2$, and comprises particles, i.e. crystalloids or groups of crystalloids, which may vary in size from 0.05 to 0.2 micron.

In achieving the objects of this invention it has been discovered, quite unexpectedly, that an aqueous slurry comprising the above described hydrated zirconium oxide, water, and carbon in the form of lamp black, forms an intimate mixture and one wherein the particles are highly reactive; and that upon the addition of boric acid to the mixture and subsequently drying the mixture at a temperature of about 250° C., the latter can be calcined at relatively low temperatures in the range of from 1400° C. to 1700° C. to produce a substantially pure finely divided zirconium boride.

While an exact explanation of the intimate coalescence of the particles of zirconia hydrate and carbon is not thoroughly understood, it is postulated that a large percentage of the finely divided particles of zirconia hydrate are of substantially the same size as the particles of lamp black, as a consequence of which the respective particles intermingle readily to form a substantially homogeneous mixture.

With respect to the carbon used in the mixture of materials, a finely divided carbon, such as lamp black or oil burner soot, is suitable and preferred to other forms of carbon, the size of the unit particles of lamp black and/or soot being within the range of from .01 to .05 micron. It is also within the purview of the invention to use a hydrophilic carbon, that is to say a carbon which has been treated with a suitable wetting agent, as for example one of the polyethylene glycol type, to insure dispersion of the carbon particles in an aqueous medium; or a wetting agent may be added to the admixed zirconia hydrate and carbon.

In carrying out the process of this invention for the preparation of zirconium boride, the zirconium component, in the form of a hydrated zirconium oxide having the consistency of a wet pulp is mixed with boric acid and carbon in the form of lamp black. The resulting slurry is then thoroughly agitated to insure an intimate mixture of the components. The slurry is then dried by heating at relatively low temperatures, as for example from 200° C. to 250° C. for several hours, depending upon the size of the charge, until substantially all of the water has been removed from the cake.

The dried cake is then ground to provide a powdery material of substantially uniform particle size, which is introduced into a furnace and heated at relatively high temperatures for predetermined lengths of time. While a globar resistance furnace may be used successfully for heating the powdery material, an induction furnace may be used with equally satisfactory results. Since it is essential to the production of a relatively pure product that the heat treatment be carried out in an inert atmosphere, an atmosphere of argon is maintained within the heating unit throughout the heat treatment.

The reaction between the zirconia hydrate, carbon and boric acid during heat treatment may be represented by the following equation:

$$ZrO_2 + 2H_3BO_3 + 5C = ZrB_2 + 5CO + 3H_2O$$

wherein 1 mol of zirconium oxide added in the form of zirconia hydrate reacts with 2 mols of boron oxide, added in the form of boric acid, and 5 mols of carbon to produce 1 mol of zirconium boride, 5 mols of carbon monoxide and 3 mols of water.

Inasmuch as boric acid is somewhat volatile with water vapor, it is desirable to add an excess of boric acid over the theoretical amount required for reacting with the zirconium oxide and carbon. The amount of boric acid in excess of the theoretical amount is not critical and an excess of from 30% to 40% is acceptable since excess boric acid will be volatilized off as $B_2O_3$ at temperatures above 1500° C. and/or removed by washing the final product. The amount of carbon used in the mixture is critical and although satisfactory results have been achieved with the use of substantially stoichiometric amounts of carbon, a slight excess of carbon of from 1% to 5%, over the stoichiometric amount has been found to insure high conversions of the oxide of zirconium to zirconium boride. Any more than about 5% carbon in the mixture tends to produce free carbon in excess of about 1% in the final product and hence cannot be tolerated.

The final product is a finely divided powdery material of high purity comprising from 80.4% to 80.7% zirconium and from 17.8% to 18.0% boron as compared to the theoretical amounts of 80.9% and 19.1% respectively for pure zirconium boride.

To further illustrate the invention, the following example is given:

Example I

To 3100 parts by weight of zirconia hydrate, having a solids content of 588 grams $ZrO_2$, was added 299 parts by weight of carbon in the form of lamp black and 826 parts by weight of boric acid. The resulting slurry was agitated for a sufficient length of time to insure an intimate mixture of the hydrate, carbon particles and boric acid whereupon the slurry was dried by heating to a temperature of about 250° C.

The dried cake was then ground to provide a powder of substantially uniform particle size which was then introduced into an induction furnace and heated at temperature of about 1650° C. for 2 hours in an atmosphere of argon.

The resulting product comprised a finely divided powder, the effective size of the unit particles being from 1 to 5 microns. The product analyzed 17.8% zirconium and 80.5% boron.

In accordance with the improved process of this invention, metalloids of refractory metals, and in particular zirconium boride, may be produced in an efficient and economical manner and from relatively inexpensive source materials. Moreover, the temperatures employed are relatively low, thereby precluding sintering and the formation of relatively large size particles, the finely divided product of this invention having an effective particle size ranging from 1 to 20 microns. The zirconium boride produced by this invention is thus ideally suited for use in powder metallurgy and in the production of cutting tool alloys and high temperature resistant alloys suitable for use in the manufacture of gas turbine blades, jet engines and the like.

While this invention has been described and illustrated by the examples shown, it is not intended to be strictly limited thereto, and other variations and modifications may be employed within the scope of the following claims.

I claim:

1. Method for the production of zirconium boride which comprises admixing an uncalcined zirconia hydrate pulp as precipitated from a basic zirconia salt solution in an amount equivalent to 1 mole on a zirconium oxide basis, 5 moles of carbon, and boric acid in an amount equivalent to 2 moles of boron oxide to form a slurry, agitating the slurry to form an intimate mixture of the hydrate, carbon and said oxidic compound of boron; drying the mixture; and then heating the dried mixture in an inert atmosphere to a temperature sufficiently high to complete the reaction between the materials and produce finely divided zirconium boride having a particle size from about 1 micron to about 20 microns.

2. Method for the production of zirconium boride which comprises admixing an uncalcined zirconia hydrate pulp as precipitated from a basic zirconia salt solution in an amount equivalent to 1 mole on a zirconium oxide basis, 5 moles of carbon, and boric acid in an amount equivalent to 2 moles of boron oxide to form a slurry, agitating the slurry to form an intimate mixture of the hydrate, lamp black and boric acid, drying said mixture by heating said mixture to a temperature sufficient to remove the water from the mixture, and then heating said dried mixture in an enert atmosphere to a temperature of from 1400° C. to 1700° C. to form zirconium boride having a particle size from about 1 micron to about 20 microns.

References Cited in the file of this patent

UNITED STATES PATENTS

| 2,872,202 | Williams | Aug. 16, 1932 |
| 2,630,370 | Kumins | Mar. 3, 1953 |

OTHER REFERENCES

Goetzel: "Treatise on Powder Metallurgy," 1950, vol. II, pp. 84–87.

Institute of Industrial Research, U. of Louisville, Ky., "A Study of Selected Metallic Borides, Nitrides and Phosphides," Progress Report, August-November 1951, 9 pages.